June 27, 1967 L. PERAS 3,327,802
POWER TRANSMISSION SERVO-CONTROL SYSTEMS FOR MOTOR VEHICLES
Filed June 5, 1964 2 Sheets-Sheet 1
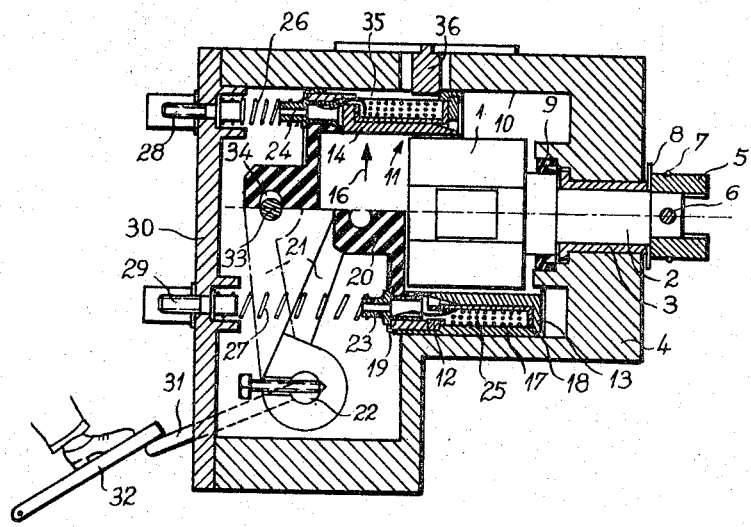
Fig-1
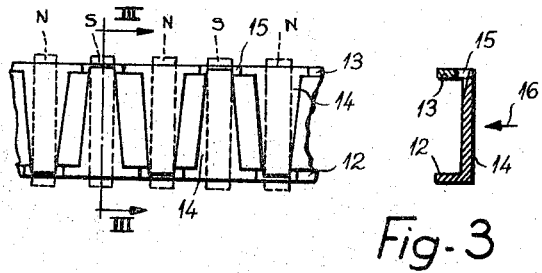
Fig-2
Fig-3
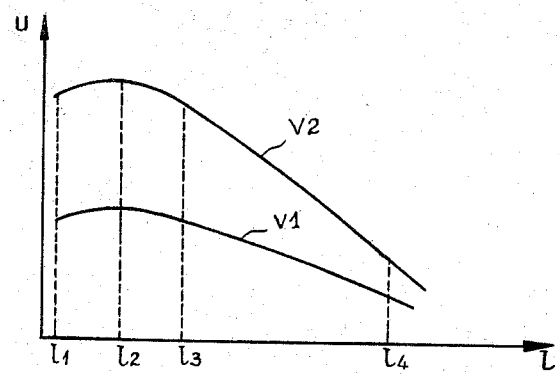
Fig-4
Inventor
Lucien Peras
By Stevens, Davis, Miller & Mosher
Attorneys June 27, 1967  L. PERAS  3,327,802
POWER TRANSMISSION SERVO-CONTROL SYSTEMS FOR MOTOR VEHICLES
Filed June 5, 1964  2 Sheets-Sheet 2

Inventor
Lucien Peras
By Stevens, Davis, Miller & Mosher
Attorneys

United States Patent Office 3,327,802
Patented June 27, 1967

3,327,802
POWER TRANSMISSION SERVO-CONTROL SYSTEMS FOR MOTOR VEHICLES
Lucien Peras, Billancourt, France, assignor to Regie Nationale des Usines Renault, Billancourt, France
Filed June 5, 1964, Ser. No. 372,800
Claims priority, application France, June 18, 1963, 938,552, Patent 1,368,243
12 Claims. (Cl. 180—54)

This invention relates to a servo system for controlling the power transmission system on motor vehicles by means of an alternator whose output voltage is a function, firstly, of the vehicle speed or the engine rotation speed (hereinafter referred to as "engine r.p.m.") and, secondly, of the engine load. The term "power transmission system" is to be understood to include the components whose function it is to establish or suppress the coupling between the engine and the vehicle driving wheels and/or to vary the power transmission ratio.

One advantage of the present invention stems from the absence of any rubbing or sliding contact for introducing the engine load factor into the operation of the alternator and also from the fact that, by virtue of the absence of any additional series-connected resistance, the internal resistance of the alternator is reduced to an absolute minimum.

A servo system according to the invention for controlling the power transmission on motor vehicles through the medium of an alternator is characterized in that said alternator comprises a permanent magnet type rotor, with multiple peripheral poles, and a wound stator which is axially slidable relative to the rotor whereby to cause the rotor magnetic flux, to which said stator is subjected, to vary as a function of their relative positions. The rotor is so coupled to a rotating shaft of the vehicle and the stator so connected to the accelerator pedal that the voltage delivered by the alternator varies as a function of vehicle speed or engine r.p.m. and of the position of the accelerator pedal.

Since it will be of advantage to utilize an alternator of small power, one or several amplifiers are inserted in most cases between the alternator and the controlled members.

With the foregoing and other objects in view, which will be made manifest in the following detailed description, reference is had to the accompanying drawings for an illustrated embodiment of the invention, wherein:

FIGURE 1 is a sectional view of an alternator according to the invention, only half the sliding stator being shown in its limit sliding positions on either side of the alternator axis;

FIGURE 2 is a developed fragmental view of the stator poles as seen from inside the stator;

FIGURE 3 shows the stator poles in section through the line III—III of FIGURE 2;

FIGURE 4 is a graph in which alternator output voltage is plotted against the stator position relative to the rotor, for two different rotor rotational speeds;

Figure 5:
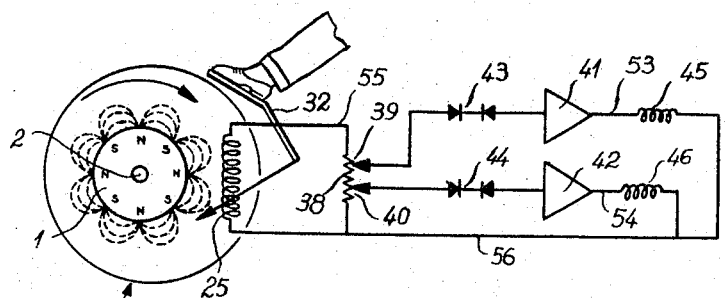
FIGURE 5 is an electric circuit diagram of a system according to the invention.

The alternator rotor shown by way of example in FIGURE 1 consists of a magnet 1 having alternating north and south poles along its periphery. With advantage, this magnet may be of the type in which metal grains are sintered by a binding agent in order to ensure both low cost and a low temperature coefficient. It is supported on the end of a shaft 2 rotating in a bush 3, and this bush is supported in a housing 4 which is made of some diamagnetic material such as a light alloy and which encloses the alternator.

The drive off a rotating shaft of the vehicle is transmitted to the shaft 2, in known manner, through a linchpin 6 and a dog 5 which cooperates with a screwdriver-shaped end on the drive shaft (not shown). The linchpin 6 has an easy sliding fit in the shaft 2 but has a tight fit in the dog 5, the inner diameter of which is slightly greater than the diameter of shaft 2 in order to allow some freedom of movement for the dog 5. A circular spring 7 prevents accidental displacement of the linchpin. The use of a floating dog—well known per se—permits some degree of misalignment yet avoids rotational vibration due to magnetic snatching. A loose washer 8 is mounted intermediate the dog 5 and the bush 3, while an oil seal 9 mounted intermediate the shaft 2 and the wall of the housing 4 prevents oil from finding its way into the housing if the alternator is mounted directly against a gearbox.

Into the bore 10 of housing 4 is mounted a stator 11 which is slidable parallel with the rotor axis. Stator 11 comprises two facing annular flanges 12 and 13 from whose inner edges extend trapezoid shaped pole fingers 14 whose width diminishes with increasing distance from their respective flanges and whose longitudinal axis are parallel with the rotor axis. On each flange, spaces are provided between the pole fingers 14, and radial slots 15 between the bases of the poles. The poles of one flange engage between those of the opposite flange by penetration into the radial slots 15. The poles of one flange do not touch those of the other flange, and the shape of the stator poles is such that a gap of a few millimeters is left between the slots and the extremities of the poles 14 inserted thereinto, in order to avoid magnetic shunting.

FIGURE 2 is a partial developed view of the pole fingers 14 of stator 11, in the direction of the arrow 16 of FIGURE 1. This view clearly shows the oblique cut of the stator poles which are alternately north and south (N and S) under the influence of the rotor magnet poles. The magnet poles are shown in broken lines in the position in which they subject the pole fingers 14 of stator 11 to a maximum magnetic flux. FIGURE 3 is a sectional view of the flanges 12 and 13 and of the pole fingers 14 of stator 11, taken through the line III—III of FIGURE 2.

The ratio of the length of the smaller base at the extremity of pole fingers 14 to that of the larger base at the root thereof on flanges 12 and 13 is preferably in the region of 5:8 in the case of a rotor magnet with eight alternating poles each occupying a peripheral length equal to 6, the length of the pole fingers 14, i.e. the height of the trapezoid, being equal to 20, it being understood that the values 6 and 20 are expressed in arbitrary units. For a different number of poles, the lengths of the bases of the trapezoids will vary in inverse ratio to the number of poles.

Obviously, the trapezoid-shaped poles 14 need not necessarily have sharp corners either at their extremities or at their roots on the flanges 12 and 13. In fact these corners may be rounded if desired, in which case the poles 14 will be shaped as curvilinear trapezoids and the gap between the poles 14 of one flange and those of the other flange will be shaped substantially as a sinusoidal band. In this instance also the preferred ratio between the trapezoid base lengths, referred to precedingly, which determines the obliquity of the sides of the poles 14 relative to the longitudinal trapezoid axes, can be applied with advantage in the case of curvilinear trapezoid-shaped poles.

The poles 14 and the flanges 12 and 13 are part of the magnetic circuit of the stator 11, which circuit is closed externally through a ring 17 which joins the peripheral edges of the flanges 12 and 13 bearing against abutments in said ring. The latter fulfills both a magnetic function and a frictional function in the bore 10 of housing 4.

By way of example, the ring 17 may be made of oil-impregnated sintered iron, or be coated externally with a substance having a low coefficient of friction, an example being polytetrafluorethylene, or else be provided with small lodgings for accommodating anti-friction rolling bearings.

The extremities 18 and 19 of this ring are set into the outer part of flange 13 and into an insulating flange 20 made of plastic material, respectively. The magnetic circuit flange 12 is clamped between the insulating flange 20 and one of the abutments in the ring 17.

The purpose of the insulating flange is, firstly, to provide a pivotal connection for the sliding stator on the end of a lever 21 rigid with a shaft 22 rotating in the housing 4 and, secondly, to insulate the wire terminations 23 and 24 of a coil 25 the winding of which surrounds all the poles 14 of the stator 11.

Highly resilient conductive springs 26 and 27 provide a connection between the wire terminations 23 and 24 and the connecting terminals 28 and 29 projecting from a cover 30 of housing 4. The springs may have their extremities welded or clamped on the terminals.

The lever 21 moves angularly in response to a shaft 22 which, through the medium of an adjustable linkage (of which only a lever 31 is shown), is connected to the vehicle accelerator pedal 32. The lever 21 has fixed to its extremity a peg 33 which engages in an ovalized hole 34 in the insulating flange 20 and which provides a positive coupling between the latter and the lever 21. The lever 21 is preferably yoke-shaped in order to ensure a symmetrical distribution of the forces transmitted.

In order to permit a clearer understanding of the manner of operation of the system, the accelerator pedal 32 is shown schematically as operating directly on the linkage lever 31. For similar considerations in FIG. 1 the sliding stator 11 is shown in the same housing in two half-sectional views representing its two limit positions respectively. In the limit position wherein the lever 21 is shown in solid lines, the stator 11 has been thrust to the right and has slightly overstepped the point at which it is subjected to maximum magnetic flux, whereas in the limit position wherein the lever 21 is shown in broken lines, the stator 11 is subjected to minimum magnetic flux.

Clearly, the sliding stator 11 can assume any intermediate position between these limit positions in response to the accelerator pedal.

In order to ensure precise angular positioning of the stator—which is imperative on machines having a large number of poles—an axial keyway 35 is provided on the bush 17, into which engages a key 36 rigidly secured onto the housing. Thus, the key 36 serves to determine the angular position of the stator and to limit its axial sliding motion.

Since the maximum flux in the stator is dependent upon the latter's axial position, the voltage or the current intensity intended to ensure a certain rotational speed will thus be dependent upon the position of the accelerator pedal, i.e., upon the engine load.

FIG. 4 shows how the alternator voltage U varies as a function of the stator displacement $l$, in the specific instance where the servo system of this invention is used to change the gearbox ratios.

In FIG. 4, $l_1$ corresponds to the stator position shown at the bottom of FIG. 1, with the foot lifted off the accelerator pedal, $l_2$ to the position in which the accelerator pedal is slightly depressed and the rotor and stator are facing each other, $l_3$ to the point symmetrical with respect to $l_1$, and $l_4$ to the position in which the accelerator pedal is fully depressed.

The characteristic curves of FIGURE 4 are plotted for two constant rotor speeds $v_1$ and $v_2$ chosen in the substantially linear section of the typical voltage vs. speed curve of the alternator.

As a general rule, the total shift from $l_1$ to $l_4$ will be approximately three times the shift from $l_1$ to $l_3$, while the voltage furnished by the alternator between positions $l_1$, $l_2$ and $l_3$ will vary only by a few percent. In a first approximation, it may further be considered that the alternator voltage varies only between $l_3$ and $l_4$. The values are given by way of indication only.

FIGURE 5 is a circuit diagram relating to a servo system according to the present invention for controlling the gear changes in a three-speed gearbox equipping a motor vehicle.

In the alternator 37, the rotating magnet 1, which is shown here as having eight poles, induces in the coil 25, with its external magnetic field, voltages which are a function, firstly, of the rotation speed of the shaft 2 coupled to the gearbox output shaft (not shown), and, secondly, of the position of the accelerator pedal 32. These voltages are applied to a potentiometer 38 having two sliders 39 and 40 respectively connected to on/off type amplifiers 41 and 42 via threshold diodes 43 and 44, respectively, each of said diodes consisting of a Zener diode and an opposed ordinary diode. The amplifiers 41 and 42 respectively feed the coils 45 and 46 of electromagnetic hydraulic valves which control the gear changes through the agency of actuators, for example. The supply source for the amplifiers 41 and 42 is not shown but will in most cases take the form of a storage battery.

The system hereinbefore described for illustrative purposes functions in the following manner:

When the peak voltage of the alternator 37, as corrected by the position of the slider 39, is greater than the threshold voltage of the rectifier 43, the amplifier 41 feeds the coil 45 and causes a change from bottom gear to second gear.

Similarly, when the voltage at the silder 40 is greater than the threshold voltage of rectifier 44, the amplifier 42 feeds the coil 46, and thereby causes a change from second gear to third gear.

Preferably, the amplifiers 41 and 42 have an electrical hysteresis for cutting off the current feeding the coils 45 and 46 when the rotation speed of the shaft 2 is less than that required to energize said coils.

Adjustment of the precise points at which the gears are changed when the accelerator pedal is fully depressed is obtained by modifying the length of the linkage levers, an example being that of the lever 31 (see FIGURE 1).

Figure 6:
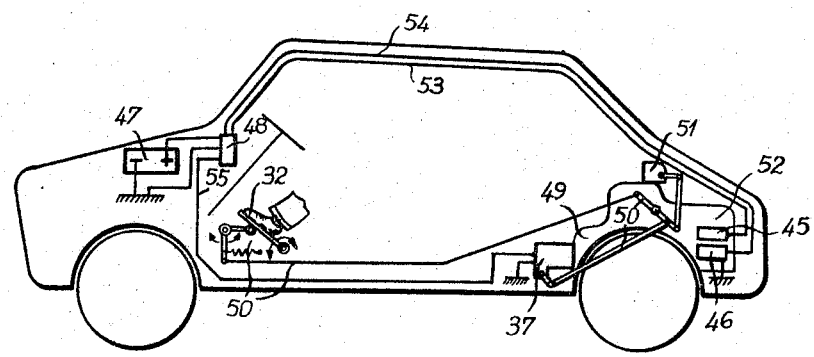
FIGURE 6 is a schematic view of the general arrangement of the various system components included in the circuit diagram of FIGURE 4.

Reference is now had to FIGURE 6 for a schematic illustration of the component parts shown in FIGURE 5, as used in an arrangement for controlling an automatic gearbox on a motor vehicle. The vehicle battery 47 feeds a housing 48 containing the amplifiers 41 and 42, the potentiometer 38 and the rectifiers 43 and 44. This housing receives information from the alternator 37 fixed to the gearbox 49 and transmits its commands to the electromagnetic valve coils 45 and 46. A linkage system 50 interconnects the accelerator pedal 32, the carburetor 51 of the engine 52, and the alternator 37. A means is thus provided of controlling the automatic gearbox without any form of rubbing or sliding contact subject to intensive wear and tear. The potentiometer 38 can be dispensed with and replaced by fixed resistors.

For a clearer understanding of the various electrical connections, the conductors 53 and 54 connecting amplifiers 41 and 42 to coils 45 and 46, and the conductor 55 connecting one of the terminals of the resistor of potentiometer 38 to the coil 25 of alternator 37, are included in FIGURES 5 and 6. The conductor 56 in FIGURE 5 is used to interconnect the grounding points on the vehicle of FIGURE 6.

The subject system of this invention is applicable for progressively controlling electric starting clutches and gear ratio changes by enabling the obtainment of laws for establishing the current flow as a function of accelerator pedal position, most notably for gradually restoring the current flow through the clutch after a gear change has been effected. In this particular application, the rectifiers 43 and 44 (FIGURE 4) are eliminated, the amplifier or amplifiers being of the progressive type, operating stepwise or not.

What is claimed is:

1. A servo system for controlling the transmission of a motor vehicle through an alternator, wherein said alternator comprises a permanent magnet type rotor having multiple peripheral poles, a wound stator axially slidable relative to said rotor whereby the magnetic flux of the rotor to which said stator is subjected varies as a function of the relative position of said rotor to said stator, means operatively connecting a rotating shaft of the vehicle to said rotor, said means permitting some degree of misalignment while at the same time avoiding vibration due to magnetic snatch during rotion, means connecting an accelerator pedal of said vehicle to said stator, said stator being moved relative to said rotor so that voltage delivered by said alternator varies as a function of the speed of said vehicle shaft and of the position of said accelerator pedal, said stator having a magnetic circuit comprising two sets of long stator poles disposed facing the active portions of the rotor magnet with their longitudinal axes parallel to the rotor axis and arranged circularly thereabout, and two flanges each supporting a set of said stator poles, the stator poles of one set engaging between those of the other set, and vice versa, with a gap between the poles of one set and those of the other set, and the stator winding being an axial coil which surrounds the stator poles between said two flanges.

2. A servo system according to claim 1, wherein said rotor is cantilevered on its drive shaft.

3. A servo system according to claim 1, wherein said magnetic circuit is closed through a ring which surrounds the stator coil and interconnects the flange peripheries.

4. A servo system according to claim 1, wherein the stator poles are shaped as a trapezoid in which the ratio of the length of the small base at the extremity of a stator pole to that of the long base at the root thereof on the magnetic circuit flanges is substantially 5:8 in the case of a magnet having eight alternating poles each of which occupies a peripheral length equal to 6 where the length of the poles is equal to 20, as expressed in arbitrary units, and wherein for a different number of poles the lengths of the trapezoid bases vary in inverse ratio to the number of poles.

5. A servo system according to claim 1, wherein the gap between the stator poles of both sets is shaped as a sinusoidal band, the stator poles being shaped as trapezoids with rounded corners.

6. A servo system according to claim 1, wherein the magnetic circuit is closed through a ring surrounding the stator coil and interconnecting the flange peripheries, the outer ring being made of a porous sintered material, means on the outer surface of said outer ring for reducing friction during rotation, said outer ring being set into the lateral walls of the magnetic circuit and, on the side remote from the rotor drive shaft, into an insulating flange bearing in its central portion a lug drilled with an oval hole into which is frictionally engaged a pin fitted rigidly to an actuating yoke connected to a shaft which is set perpendicularly to the sliding direction and which is connected through adjustable linkage means to the accelerator pedal.

7. A servo system according to claim 6 wherein said anti-friction means comprises an anti-friction coating on said outer ring.

8. A servo system according to claim 6 wherein said anti-friction means comprises rolling bearing members.

9. A servo system according to claim 1, as applied to a clutch, a gearbox and the like.

10. A servo system according to claim 1 wherein the rotational speed of said vehicle shaft is determined by vehicle speed.

11. A servo system according to claim 1 wherein the rotational speed of said vehicle shaft is determined by the rotational speed of the vehicle engine.

12. A servo system according to claim 1 wherein said means connecting said rotating shaft and said rotor comprises a floating dog on a rotor drive shaft.

References Cited

UNITED STATES PATENTS

| 904,794 | 11/1908 | Midgley | 310—191 X |
| 1,057,928 | 4/1913 | Briggs. | |
| 3,124,693 | 3/1964 | Peras | 290—16 XR |

FOREIGN PATENTS 1,249,548 11/1960 France.

BENJAMIN HERSH, *Primary Examiner.*

MILTON L. SMITH, *Examiner.*